(12) United States Patent
Luo et al.

(10) Patent No.: US 12,413,719 B2
(45) Date of Patent: Sep. 9, 2025

(54) ADAPTIVE INTERPOLATION FILTER SEARCH

(71) Applicant: ATI TECHNOLOGIES ULC, Markham (CA)

(72) Inventors: Ying Luo, Richmond Hill (CA); Razvan Florin Dan-Dobre, Markham (CA); Min Wang, Mississauga (CA); Edward Harold, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 88 days.

(21) Appl. No.: 18/212,887

(22) Filed: Jun. 22, 2023

(65) Prior Publication Data

US 2024/0430414 A1 Dec. 26, 2024

Related U.S. Application Data

(60) Provisional application No. 63/431,987, filed on Dec. 12, 2022.

(51) Int. Cl.
*H04N 19/117* (2014.01)
*H04N 19/105* (2014.01)
*H04N 19/139* (2014.01)
*H04N 19/156* (2014.01)
*H04N 19/172* (2014.01)
*H04N 19/513* (2014.01)
*H04N 19/80* (2014.01)

(52) U.S. Cl.
CPC ........ *H04N 19/117* (2014.11); *H04N 19/105* (2014.11); *H04N 19/139* (2014.11); *H04N 19/156* (2014.11); *H04N 19/172* (2014.11); *H04N 19/513* (2014.11); *H04N 19/80* (2014.11)

(58) Field of Classification Search
CPC .. H04N 19/117; H04N 19/105; H04N 19/139; H04N 19/156; H04N 19/172; H04N 19/513; H04N 19/80; H04N 19/147; H04N 19/523; H04N 19/82
USPC ....................................................... 375/240
See application file for complete search history.

(56) References Cited

U.S. PATENT DOCUMENTS

| | | | |
|---|---|---|---|
| 7,239,424 B1 * | 7/2007 | Berkner | H04N 1/6072 358/1.9 |
| 2010/0111182 A1 * | 5/2010 | Karczewicz | H04N 19/192 375/E7.076 |
| 2020/0244971 A1 * | 7/2020 | Wang | H04N 19/172 |
| 2021/0227243 A1 * | 7/2021 | Wu | H04N 19/80 |
| 2023/0179763 A1 * | 6/2023 | Zhao | H04N 19/523 375/240.02 |

* cited by examiner

*Primary Examiner* — Susan E. Hodges

(57) ABSTRACT

Techniques for implementing adaptive interpolation filter search in video encoding are disclosed. Conventional interpolation filter searching is simplified to implement adaptive interpolation filter search by selecting one or more first filter types to determine one or more initial interpolation costs. After identifying an MV that produces a target interpolation error for one of the one or more first filter types, one or more secondary interpolation costs are calculated for one or more additional filter types based on the identified MV, and one of the one or more first filter type and one or more additional filter types that results in minimal interpolation error is selected as the interpolation filter type.

17 Claims, 6 Drawing Sheets

ADAPTIVE INTERPOLATION FILTER SEARCH

BACKGROUND

To reduce the amount of data transmitted in video systems, video data is often compressed through a coding scheme. A video codec is a device or firmware/software program that enables video compression and/or decompression for digital video. In areas of video with motion, pixel values change from one frame to the next, and the video compression scheme must send more data than for static frames to indicate a larger number of pixel values that are changing. In extreme cases of high-frequency detail changes, the video quality may decrease to stay within an encoding budget. In order to maintain video quality, yet reduce the amount of data that is transmitted, various compression techniques have been developed. For example, MPEG-based video compression typically operates on groups of neighboring pixels, called macroblocks. The macroblocks are compared from one frame to the next and the video compression codec sends only the differences within those blocks. However, the process of encoding video is often inefficient, as hundreds or thousands of calculations often need to be performed for each frame of video in order to identify which encoding settings yield the closest match between blocks.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
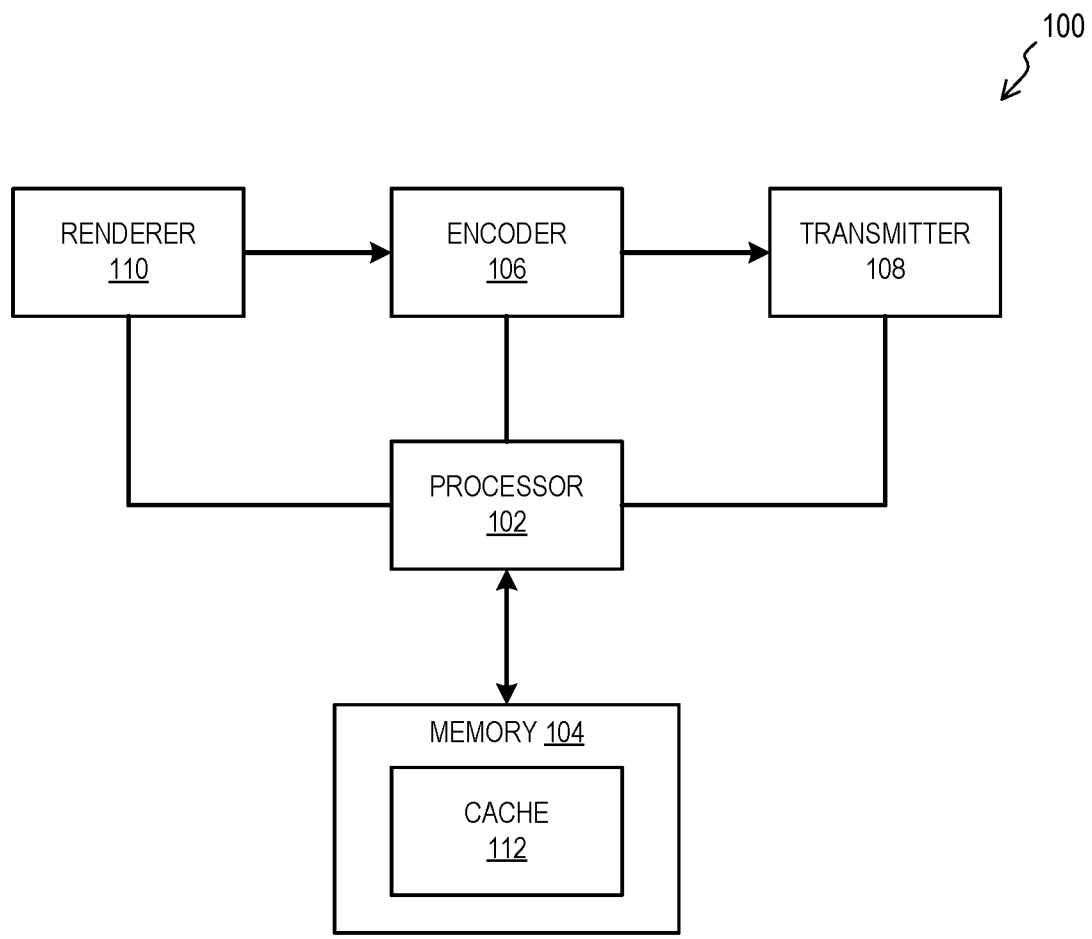
FIG. 1 is a block diagram illustrating processing components used to execute a motion estimation search in accordance with some embodiments.

Motion estimation is used to determine motion vectors that describe the transformation from one image to another image from adjacent frames in a video stream. Motion estimation involves comparing each block (e.g., macroblock, pixel, or sub-pixel) of a current frame with a corresponding block and its adjacent neighbors in a previous or subsequent frame of the video stream, referred to as a search area. A motion vector is created that models the movement of a block from an initial location in the current frame to another location in a previous or subsequent frame. This movement, calculated for all the blocks comprising a frame, constitutes the motion on a per block basis estimated within a frame.

Sub-pixel motion estimation is used in inter-frame prediction of video compression algorithms and includes sub-pixel interpolation and sub-pixel search to find the motion vector (MV) having the lowest matching error (referred to as the closest-match MV). When performing a sub-pixel (half-pixel, quarter-pixel, etc.) motion search, a many-tap filter is often used in order to differentiate half-pixels, quarter-pixels, etc. The many-tap filter can include any of a variety of filter types, such as a "regular" filter, a smooth filter, a sharp filter, etc., and thus the motion search process may employ the multi-tap filter for a number of different filter types during a motion search in order to identify a filter that minimizes decoding errors. However, the pixel search array grows as the search resolution (full pixel, half-pixel, quarter-pixel, etc.) increases. Thus, conventional approaches of repeating the motion search for each filter type on substantially large search arrays either exacts a performance penalty (e.g., when each search with a corresponding filter type is performed serially) or requires considerable hardware for a parallel-search implementation, which increases the size, complexity, cost, and power consumption of a resulting chip or device implementing the conventional approach.

For a sub-pixel motion search, rather than performing the motion search multiple times for multiple filter types, aspects of the present disclosure use one filter type to perform the motion search to identify the closest-match MV (i.e., the MV having the lowest matching error). Each filter type of a set of filter types (e.g., three or more filters) is then used for respective interpolation of a predicted MV, and then the best filter type from the set is determined based on its "cost," representing minimized decoding errors. The filter type of the set of filter types with the lowest cost (or error) is then selected as the "best" filter type, referred to herein as an "lowest cost" filter type, and this lowest cost filter type is used with a many-tap filter to perform the interpolation. Thus, rather than interpolating each search point in a large search array for every filter type, the closest-match MV is identified using one filter type and then only one MV is interpolated for other filter types in order to pick the lowest cost filter (i.e., the filter the produces the smallest interpolation cost or error). In some embodiments, the filter type that is used to identify the closest-match MV is randomly selected, selected based on machine learning, selected based on hysteresis, or selected using any other appropriate initial filter selection method. This leads to a smaller, more compact hardware implementation and improved computational efficiency.

Figure 5:
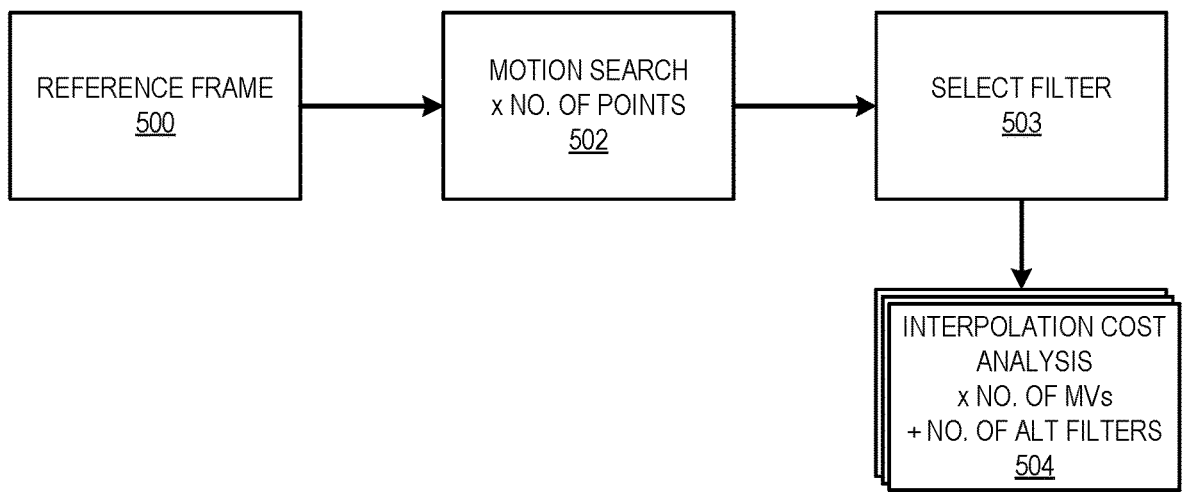
FIG. 5 is a flowchart depicting processing complexity of adaptive motion and interpolation search in accordance with some embodiments.
Figure 6:
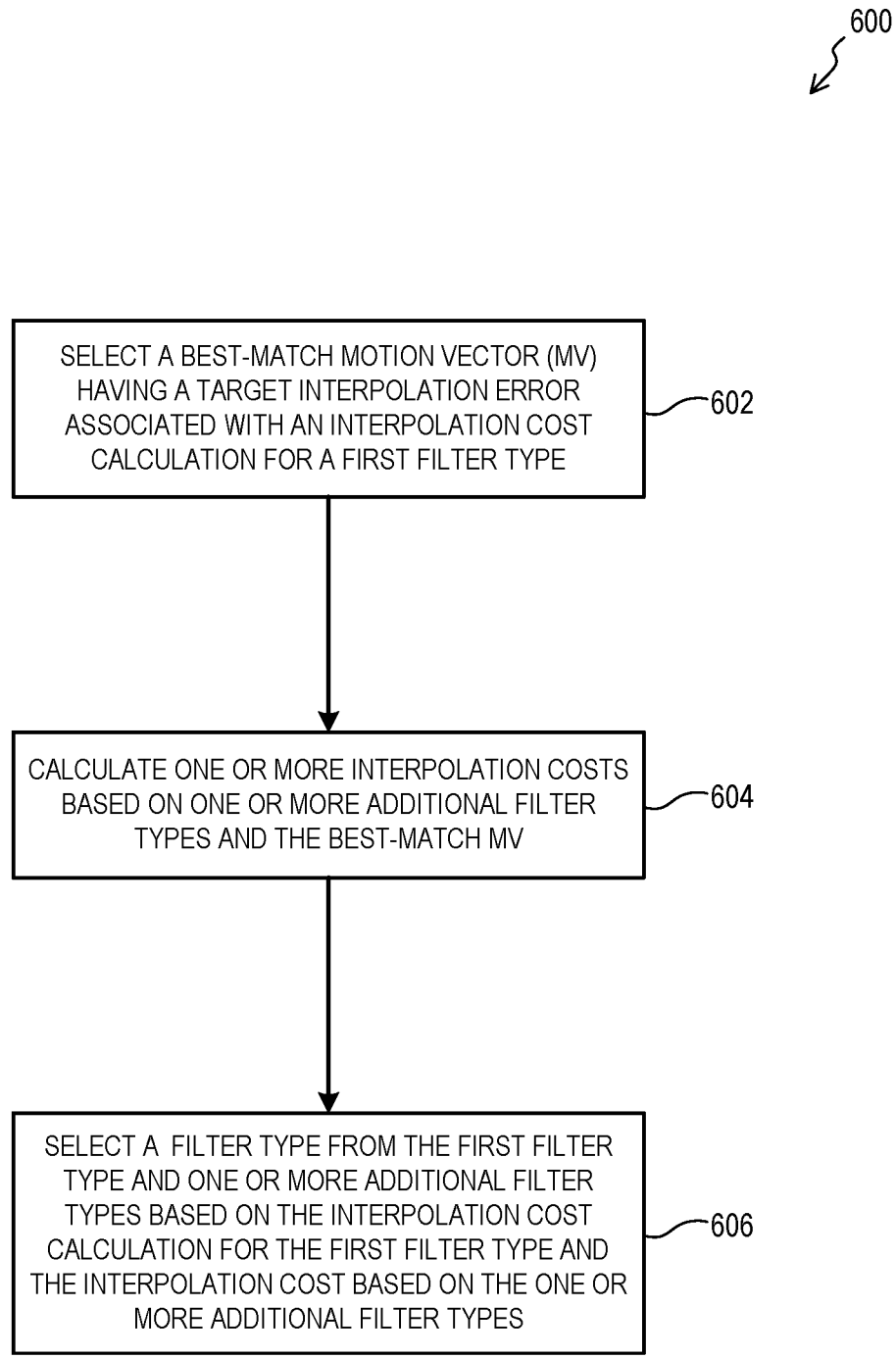
FIG. 6 is a block diagram of a method for adaptive interpolation filter search in accordance with some embodiments.
Figure 7:
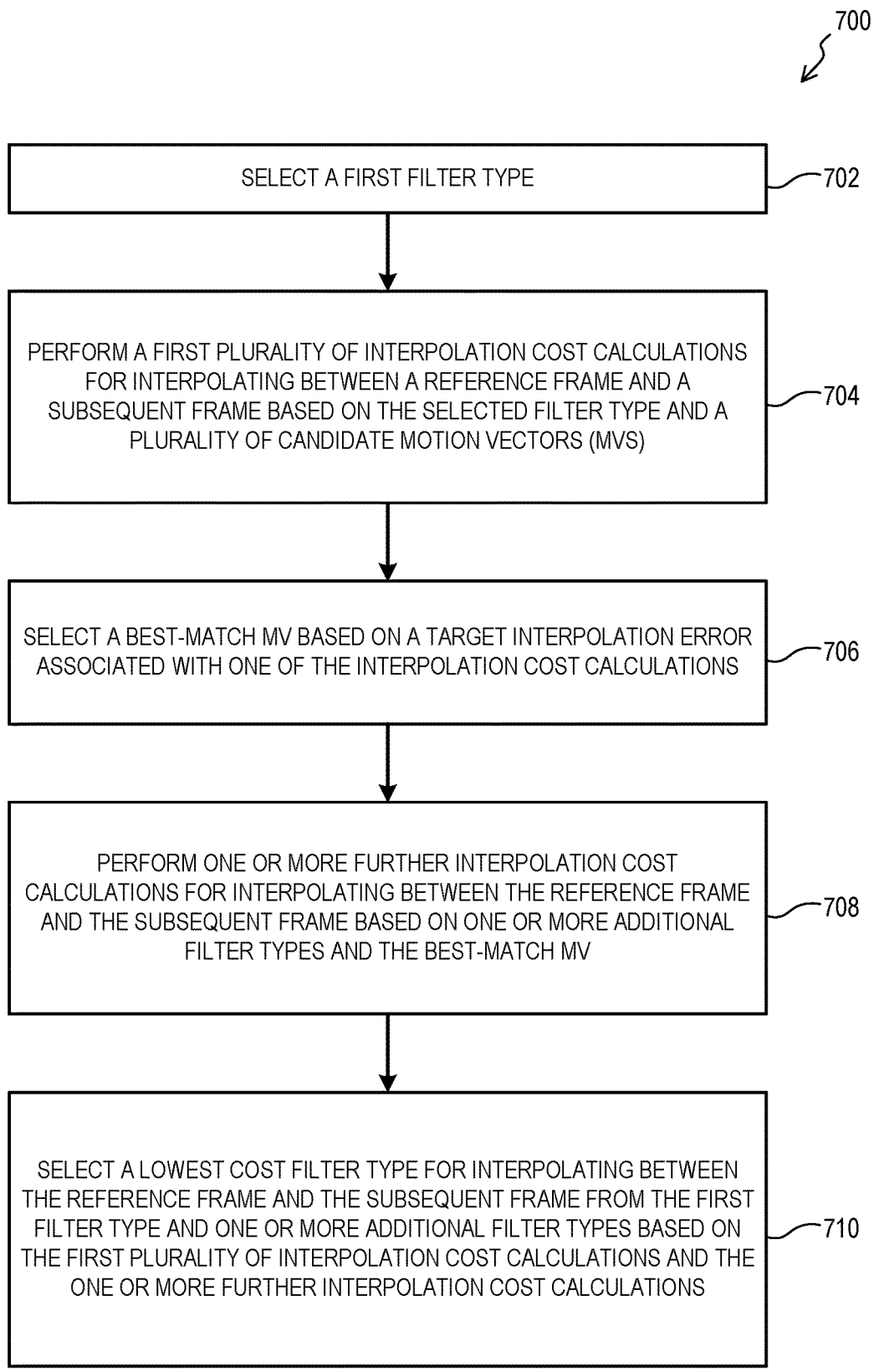
FIG. 7 is a block diagram of a method for adaptive interpolation filter search in accordance with some embodiments.

FIGS. 5-7 illustrate techniques for implementing adaptive interpolation filter search in video encoding that effectively reduce computational requirements for encoding video when compared with conventional interpolation filter searching techniques. For example, in some embodiments, conventional interpolation filter searching is simplified to implement adaptive interpolation filter search by selecting one or more first filter types to determine one or more initial interpolation costs for generating an interpolated frame. After identifying a closest-match MV that produces minimal error for one of the one or more first filter types, one or more secondary interpolation costs are calculated for one or more additional filter types based on the closest-match MV, and one of the one or more first filter types and one or more additional filter types that results in minimal interpolation error is selected as the lowest cost interpolation filter type.

In some embodiments, by limiting the calculation of secondary interpolation costs to the closest-match MV, adaptive interpolation filter search as disclosed herein is able to reduce the number of calculations required for interpolation filter search by as much as about 60% when, for example, a single first filter type is used to generate a closest-match MV and interpolation costs of two additional filter types are determined using the closest-match MV. This improvement in performance is due to eliminating interpolation cost calculations for any MVs other than the closest-match MV for the additional filter types. In this way, although some accuracy is sacrificed by eliminating the interpolation cost calculations for MVs other than the closest-match MV for the additional filter types, processing efficiency is improved with only a limited reduction in the potential for determining a truly closest-match MV that could be determined by performing the eliminated calculations. In some embodiments, the one or more first filter types are selected randomly or using historical or machine learning methods, and, in some embodiments, more than one first filter type is selected in order to improve accuracy while still improving performance compared to conventional implementations.

Video compression algorithms are often executed by a video encoder, which encodes data received from a video renderer such that the encoded data is suitable for transfer to and decoding by, e.g., a client device displaying the video data. In some embodiments, the present disclosure is directed to more efficient methods of encoding video data that, e.g., reduce computational requirements. However, in some embodiments, the methods are configured to utilize conventional processing hardware and integrate into existing encoding systems. Accordingly, particularly in order to provide context for the various embodiments disclosed herein, various aspects of video processing are described hereinbelow with reference to FIGS. 1-4 along with a general overview of motion search and estimation and frame interpolation.

FIG. 1 is a block diagram illustrating processing components of a processing system 100 used to execute video processing and, in some embodiments, to execute a motion estimation search. The processing system 100 comprises a processor 102, a video encoder 106, a transmitter 108, a renderer 110, and a memory 104. The processor 102 is in communication with video encoder 106, transmitter 108, renderer 110, and memory 104, which includes a cache memory 112 local to video encoder 106. In some embodiments, the processor 102 is configured to cause the video encoder 106 to perform motion estimation search during encoding of frames of video data. In some embodiments, the processor 102 includes a CPU, a GPU, a CPU and GPU or one or more other coprocessors located on the same die, or one or more processor cores. In some embodiments, each processor core is a CPU or a GPU. In some embodiments, the memory 104 is located on the same die as the processor 102, and in other embodiments the memory 104 is located separately from the processor 102. In some embodiments, portions of the memory 104 include volatile and/or non-volatile memory, e.g., random access memory (RAM), dynamic RAM, or a cache.

The renderer 110 is configured to render data as images (i.e., produce the next frame or portion, such as a slice, block, macroblock, or field of the next frame) for display by, for example, executing rendering instructions/commands included in applications. In some embodiments, the renderer 110 is configured to perform color space conversion, scaling, and/or optics warping (e.g., to correct image distortion). The renderer 110 is also configured to provide motion information to the video encoder 106 indicating movement (e.g., amount and direction) of video data to be used by video encoder 106 to perform motion mapping. The video encoder 106 is configured to receive video data from the renderer 110, receive instructions from the processor 102 to encode the video data, and provide the encoded video data to the transmitter 108. In some embodiments, the video encoder 106 is configured to provide audio-video (A/V) synchronization of received audio data and the received video data as well as format the video data into packets (e.g., IP packets) for transporting over a network. In some embodiments, the video encoder 106 is configured to perform motion mapping using motion information provided by renderer 110 indicating movement (e.g., amount and direction) in video data. Motion mapping typically includes using information determined using a variety of techniques, such as downsampling (e.g., processing in a reduced resolution to determine information about predicted MVs of a reference frame) of data in reference frames produced by the renderer 110.

In some embodiments, the transmitter 108 is configured to transmit video data to be decoded and/or displayed (e.g., as part of a client network interface controller (NIC)) over one or more networks (e.g., local area network), including wired (e.g., Ethernet) or wireless networks (e.g., via Wifi, Bluetooth, and other wireless standards). However, in some embodiments, the transmitter 108 is configured to transmit the encoded video data to a decoder on the same processing system 100 (e.g., via a local device bus).

Figure 2:
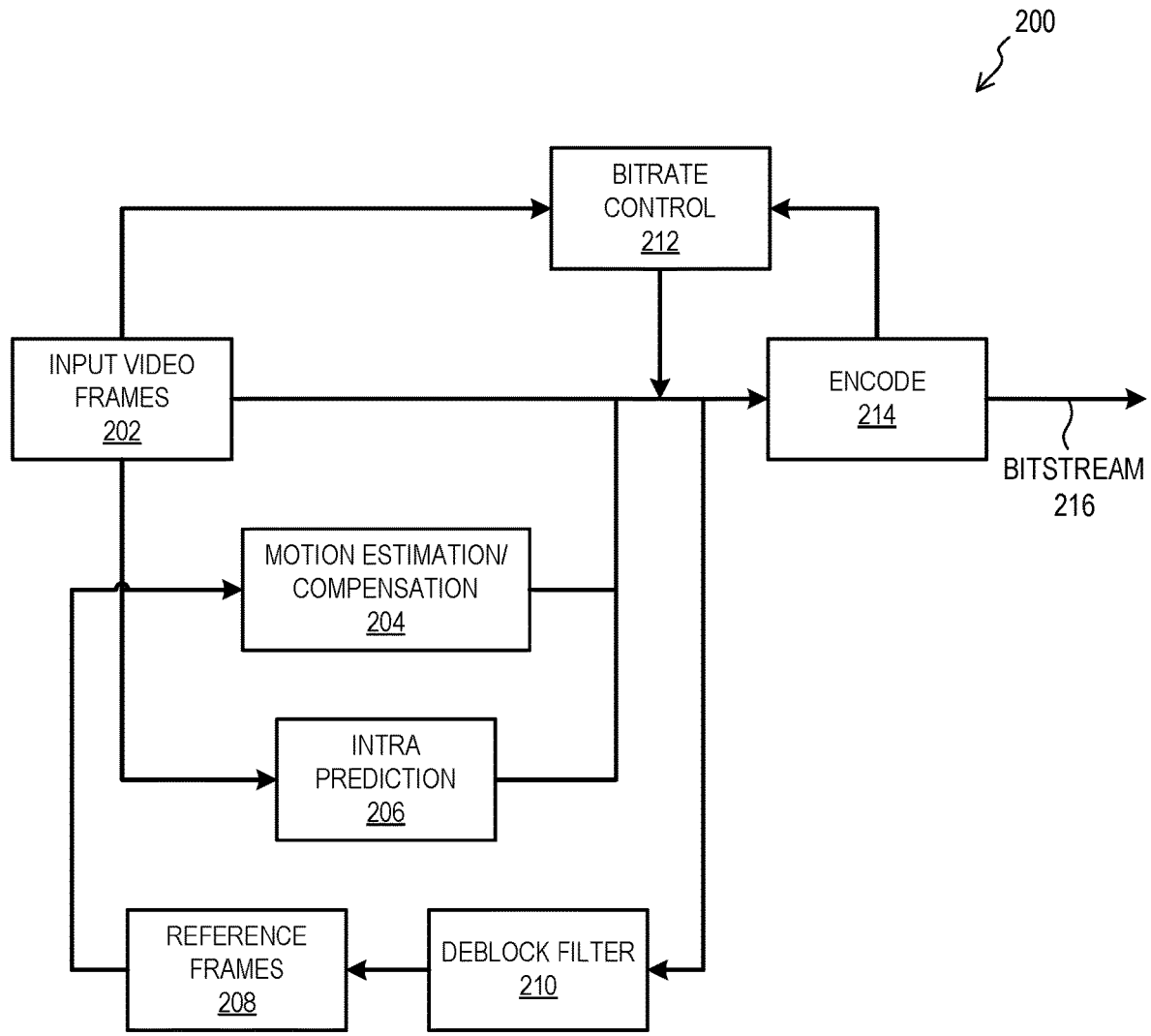
FIG. 2 is a block diagram of an encoder pipeline used to execute motion estimation in accordance with some embodiments.

The encoding system 200 of FIG. 2 is an example of an encoder pipeline that receives input video frames 202 and produces an encoded output video bitstream 216. In some embodiments, the video encoder 106 of FIG. 1 includes the encoding system of FIG. 2. The input video frames 202 are input to a motion estimation/compensation circuitry 204 and an intra-prediction unit 206. The output of these components is then combined with the original input video frames through a transform process (T), such as a forward discrete cosine transform (fDCT) module, and a quantization process (Q). The quantized data is then processed through an inverse quantization process (Q−1) and an inverse transform process (T−1), such as inverse discrete cosine transform (iDCT). The inversely transformed data is then combined with the motion estimation output for the intra-prediction unit 206 and an optional in-loop deblocking filter 210 to generate reference frames 208. A bitrate control unit 212 provides control over the quantization (Q) process, which also takes input from a lossless entropy decode module 214 to produce the output video bitstream 216. The bitrate control unit 212 receives uncompressed video data in the form of input video frames 202 from a source and produces a compressed output video bitstream 216 in accordance with an encoding method, such as standard H.264 encoding. A rate controller component dynamically adjusts encoder parameters to achieve a target bitrate specified by a bitrate parameter. The rate controller allocates a budget of bits to each region, individual picture, group of pictures, and/or sub-picture in a video sequence.

In some embodiments, the motion estimation/compensation circuitry 204 implements a method that performs filtering and analysis of candidate MVs. In some embodiments, the motion estimation/compensation circuitry 204 is used in a GPU shader system. In general, a shader is a set of software instructions, which is used by graphic resources primarily to perform rendering effects. Shaders are written to apply transformations to a large set of elements at a time, such as to each pixel in an area of the screen, or for every vertex of a model.

The motion estimation method performed by the motion estimation/compensation circuitry 204 determines a list of several candidate MVs and retains them through multiple computation passes. This method prevents a single best cost score in the initial pass from prematurely dominating the results for its macroblock. In conventional implementations, all candidate MVs are used as potential candidate MVs so that the best combination of differential vectors rises to the top of the candidate list. The encoding system 200 is often configured to use a large number of compute engines, such as on a highly parallel GPU platform.

In motion compensated devices, motion estimation is performed by analyzing successive frames to identify objects that are in motion. The motion of each object is then described by a MV. A MV is characterized by length or magnitude parameter, and a direction parameter. Once MVs are computed, they are then assigned to every pixel in a frame, forming a corresponding vector field. Finally, interpolation of pixels proceeds by deflecting the motion trajectory using associated vectors. Possible (or candidate) MVs are then often determined using, e.g., phase plane correlation. MVs are often similarly computed, for example, by block matching, hierarchical spatial correlation, gradient methods, or the like.

For example, to compute MVs using block matching, a frame is divided into non-overlapping blocks (groups of pixels). A given group of pixels (e.g., in Fn) is then compared to an equally sized group of pixels (a search group) in the next frame (e.g., Fn+1), starting at the same location. The comparison is often performed on a pixel-by-pixel, sub-pixel-by-sub-pixel basis, or group-of-pixels-by-group-of-pixels basis. The search group is moved to all possible locations in the next frame, and the correlation of groups of pixels in Fn to groups of pixels in Fn+1 is determined. Correlated groups in Fn and Fn+1 define possible (or candidate) vectors for Fn.

Once candidate vectors are formed, a subset of these vectors is selected and ultimately assigned as MVs to individual pixels or groups of pixels in Fn depending on the confidence level established for the candidate vectors. The groups of pixels used to determine candidate vectors need not be the same as the groups of pixels for which vectors are assigned. Pixels may be grouped in any number of ways— for example by edge detecting objects; using defined blocks; or otherwise in manners understood by those of ordinary skill in the art. MVs are typically pegged at Fn, that is, each candidate vector is evaluated for selection as a MV for a group of pixels in Fn. Candidate vectors map the source pixels to corresponding destination pixels in Fn+1. If there is a high degree of correlation between source pixels in Fn and destination pixels Fn+1, then the candidate vector is selected as a MV for the source pixels.

Figure 3:
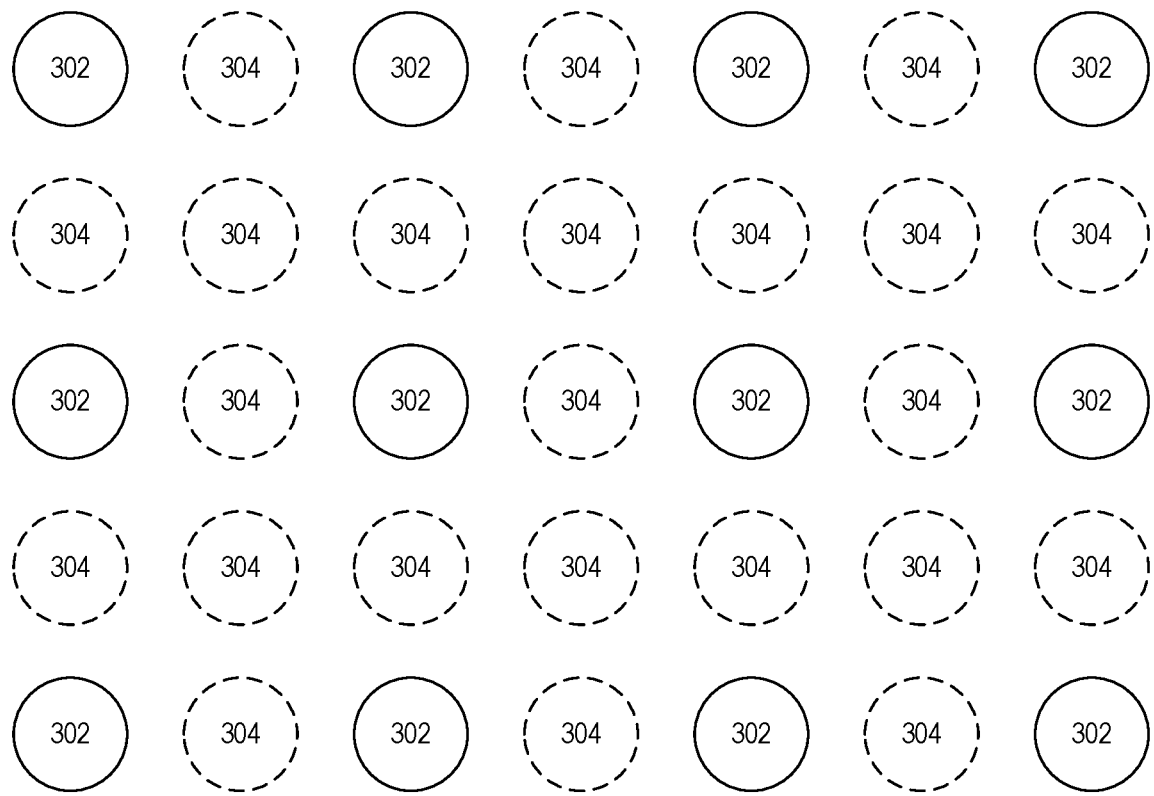
FIG. 3 is a block diagram illustrating relative positions of pixels and subpixels in accordance with some embodiments.

In some implementations, a block or group of pixels is shifted between frames by a non-integer number of pixels by interpolating neighboring pixels. For example, during motion estimation/compensation, when a motion vector has subpixel accuracy (e.g., half-pixel or quarter-pixel), the encoder or decoder determines pixel values at sub-pixel positions in the reference frame. The encoder or decoder generates values for these sub-pixel positions using interpolation filters. FIG. 3 illustrates relative positions of pixels and subpixels in accordance with some embodiments, showing sub-pixel sample positions 304, values for which are computed by interpolation of values of one or more integer-pixel positions 302. As a simple example, a value for a sub-pixel sample position 304 can be interpolated from values associated with integer-pixel positions 302 by summing the values of integer-pixel values near to (e.g., within a specified radial distance or number of pixels) the sub-pixel sample position 304 and dividing by the number of summed values to determine a value for a sub-pixel sample position 304 corresponding to an average of the nearby integer-pixel values.

As noted above, sub-pixel motion estimation is often used in inter-frame prediction of video compression algorithms and includes sub-pixel interpolation and sub-pixel search to find a closest-match MV, e.g., an MV with a target matching error. For a sub-pixel motion search, rather than performing the motion search multiple times for multiple filter types, in some embodiments, the renderer 110 uses one filter type to perform the motion search to identify a closest-match MV. The renderer 110 then uses each filter type of a set of filter types (e.g., three or more filters) for respective interpolation of a predicted MV and selects a filter type from the set based on its "cost," representing minimized decoding errors. Thus, for a given filter type, in some embodiments, renderer 110 calculates the cost by: predicting the best/closest-match pixel based on a motion search using the given filter type; calculating an amount of distortion between the predicted pixel and original pixel (e.g., based on differences in intensity and/or color); and calculating the cost based on the distortion. The renderer 110 then selects the filter type of the set of X filter types with the lowest cost as the lowest cost filter type, and this lowest cost filter type is used for the many-tap filter for the interpolation. Thus, rather than interpolating each search point in the large search array for every filter type, the renderer 110 identifies a closest-match MV using one filter type (e.g., randomly selected, selected based on machine learning, selected based on hysteresis analysis, or selected using any other appropriate initial filter selection method) and then only one MV is interpolated for other filter types in order to pick the lowest cost filter or filter type (i.e., the filter type that produces the smallest interpolation cost or error). This leads to a smaller, more compact hardware implementation and improved computational efficiency.

The process of using a single filter type for an initial motion search, selection of a lowest cost filter type based on a distortion cost analysis, and then using the identified lowest cost filter type for a single set of interpolation cost calculation is more efficient than the conventional approach of performing the search-and-interpolation processes for each filter type, either serially or in parallel. Some implementations require only a single search (e.g., 81 search points) and X cost analyses (X=number of filter types used), whereas a conventional approach requires X searches of 81 search points, which is computationally expensive and requires either serialization (and thus computational impact) or significant additional hardware to support parallelization of the X searches. In some embodiments, a sub-pixel search is performed three times using different filter types to find the lowest cost filter type with a corresponding MV. However, this can be very computation intensive. For example, if there are nine total candidate MVs, twenty-seven interpolations would need to be performed.

Figure 4:
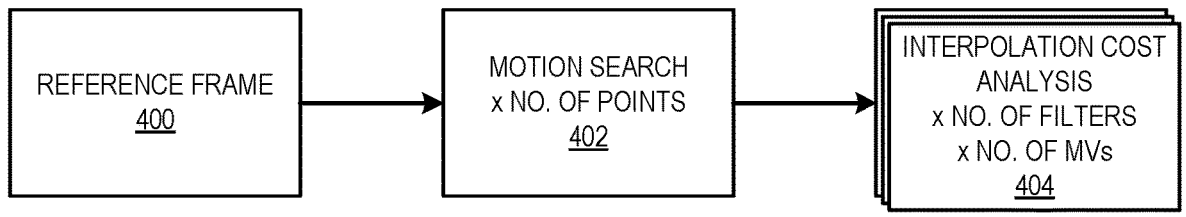
FIG. 4 is a flowchart depicting processing complexity of a conventional motion and interpolation search.

For example, FIG. 4 is a flowchart depicting processing complexity in a conventional motion and interpolation search. The reference frame 400 is analyzed relative to one or more subsequent frames by performing a plurality of motion searches 402 (e.g., 81 motion searches based on 81 search points). After determining candidate motion vectors from the motion search 402, interpolation cost analysis 404 is performed, which conventionally includes an interpolation cost analysis for each candidate motion vector determined by the motion search 402 for each of a number of filter types. As noted above, if there are nine total candidate MVs and three filter type options, twenty-seven interpolation cost analyses would need to be performed.

Aspects of the present disclosure include reducing the processing complexity of interpolation search in video encoders. In some embodiments, a first (e.g., regular) filter type is utilized to calculate an interpolation cost based on candidate MVs. For example, the AOMedia Video 1 video coding format (AV1) supports three interpolation filter types (regular, smooth, and sharp finite impulse response (FIR) interpolation filters) with precision up to ⅛ sub-pixel for luma and precision up to 1/16 for chroma. In some embodiments, interpolation filter types are selected from filter types available in AOMedia Video 1 video coding format. In some embodiments, filter types used to calculate an interpolation cost based on candidate MVs are linear low pass filters. Low pass filters allow signals of low frequencies to pass through in a "passband" configuration while blocking signals of higher frequency often referred to as the "stopband." Such low pass filters are typically characterized by their transfer function, which in the frequency domain often has a passband from 0 Hertz to a designed cut-off frequency, establishing a stopband from the near the cut-off frequency up to a maximum frequency (e.g., the Nyquist frequency). The transition from the passband's cut-off frequency to the beginning of the stopband frequency is referred to as the filter roll-off or slope.

Different codecs employ different filter types to best estimate interpolated subpixel motion. For example, AV1 specifies three filter types: smooth, regular, sharp, where each type is characterized by its transfer function: the smooth filter has flat passband with a low cut-off frequency and shallow roll-off transition to stopband. The sharp filter, in contrast with the smooth filter, has the largest passband with the highest cut-off frequency and sharp roll-off transition to stopband. The regular filter has a transfer function (passband, roll-off, stopband) that can be characterized as a middle-ground between the smooth and sharp filters. In some implementations, these filter types target various video content as follows: the sharp filter is typically an interpolation filter designed for a prediction block with a high signal bandwidth and relatively low noise and distortion level. The smooth filter is a smoothing filter typically designed for a prediction block with a lower signal bandwidth and larger noise and distortion levels. In some implementations, the regular filter is an interpolation filter designed for a prediction block with typical bandwidth and typical noise and distortion levels found in common video sources.

In some embodiments, different interpolation filter types are selected to cover different passband characteristics. In some embodiments, a target matching interpolation error associated with the regular filter is found and the closest-match MV (i.e., the MV with the lowest cost or error) is determined. In some embodiments, a "target" interpolation error is a lowest error, an error below one or more thresholds, an error lower than one or more other identified interpolation errors, or an error associated with a previously selected filter type (e.g., within a predetermined or variable length sliding window of time). Subsequently, the matching error is calculated using the other two interpolation filter types (smooth and sharp) on the same MV. The filter type producing the target matching error is selected. In this example, if the motion search 402 produces nine candidate MVs and two alternative filter types are used, the total number of interpolations is 9+2=11 (i.e., the number of candidate MVs used for selecting the closest-match MV added to the number of additional filter types in the one or more additional filter types). In some embodiments, a MV search is independent from interpolation filter types.

FIG. 5 is a flowchart depicting processing complexity of adaptive motion and interpolation search in accordance with some embodiments. Notably, although the reference frame 500 and motion search 502 are analogous to the conventional approaches of FIG. 4, methods disclosed herein select one or more filter types 503 to perform an initial interpolation cost analysis. In some embodiments, methods disclosed herein select one or more filter types 503 to perform an initial interpolation cost analysis. In some embodiments, as indicated above, the one or more filter types selected for initial interpolation error calculation are, e.g., randomly selected, selected based on machine learning, selected based on hysteresis, or selected using any other appropriate initial filter type selection method. For example, machine learning or hysteresis in some embodiments analyzes past encoding results and selects one or more filter types that are predicted to produce a minimal interpolation error, e.g., overall historically, for particular types of video (such as live action versus animation), and/or for particular types of motion (e.g., video including shaky footage versus video of a mostly inanimate scene). Subsequently, only one MV is interpolated for other filter types in order to pick the filter type associated with the least interpolation cost or error. Accordingly, as noted above, if the motion search 402 produces nine candidate MVs and two alternative filter types are used, the total number of interpolation cost calculations is 9 (interpolation cost based on a first selected filter type and candidate MVs)+2 (a single interpolation cost calculation for each of the one or more alternative filter types)=11. As such, in some embodiments, the number of interpolation cost calculations 504 required for video encoding is reduced from as many as 27 to as few as 11. However, in some embodiments, in order to further reduce error, initial interpolation costs are calculated based on two or more initial filter types, a closest-match candidate MV is selected, and then one or more further interpolation costs are calculated using one or more other filter types based on the predetermined closest-match candidate MV.

FIG. 6 is a block diagram of a method 600 for adaptive interpolation filter search in accordance with some embodiments. At block 602, an encoder such as video encoder 106 of FIG. 1 selects a closest-match MV having a target interpolation error associated with an interpolation cost calculation for a first filter type. At block 604, the encoder calculates one or more interpolation costs based on one or more additional filter types and the closest-match MV. At block 606, the encoder selects a lowest cost filter type from the first filter type and one or more additional filter types based on the interpolation cost calculation for the first filter type and the interpolation cost based on the one or more additional filter types.

FIG. 7 is a block diagram of a method 700 for adaptive interpolation filter search in accordance with some embodiments. At block 702, an encoder such as video encoder 106 of FIG. 1 selects a first filter type. At block 704, the encoder performs a first plurality of interpolation cost calculations for interpolating between a reference frame and a subsequent frame based on the selected filter type and a plurality of candidate MVs. At block 706, the encoder selects a closest-match MV based on a target interpolation error associated with one of the interpolation cost calculations. At block 708, the encoder performs one or more further interpolation cost calculations for interpolating between the reference frame and the subsequent frame based on one or more additional filter types and the closest-match, selected MV. At block 710, the encoder selects a lowest cost filter type for interpolating between the reference frame and the subsequent frame from the first filter type and one or more additional filter types based on the first plurality of interpolation cost calculations and the one or more further interpolation cost calculations.

In some embodiments, the apparatus and techniques described above are implemented in a system including one or more integrated circuit (IC) devices (also referred to as integrated circuit packages or microchips), such as the adaptive interpolation filter search methods described above with reference to FIGS. 5-7. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory computer readable medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disk, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage medium. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   selecting a first motion vector (MV) having a first interpolation error associated with an interpolation cost calculation for a first filter type;
   calculating one or more interpolation costs based on one or more additional filter types and the first MV; and
   selecting a filter type from the first filter type and one or more additional filter types based on the interpolation cost calculation for the first filter type and the interpolation cost based on the one or more additional filter types, wherein the calculating comprises performing a total number of interpolation cost calculations for selecting a filter type limited to a number of candidate MVs used for selecting the first MV added to the number of additional filter types in the one or more additional filter types.

2. The method of claim 1, further comprising selecting the first filter type randomly from a group of filter types, selecting the first filter type based on machine learning, or selecting the first filter type based on hysteresis analysis.

3. The method of claim 1, wherein the first filter type and one or more additional filter types comprise one or more of a regular filter, a sharp filter, and a smooth filter.

4. The method of claim 1, wherein calculating the one or more interpolation costs comprises performing only a single interpolation cost calculation for each of the one or more additional filter types before selecting the filter type.

5. The method of claim 1, wherein the first filter type and one or more additional filter types are selected from filter types available in AOMedia Video 1 video coding.

6. A method comprising:
selecting a first filter type;
performing a first plurality of interpolation cost calculations for interpolating between a reference frame and a subsequent frame based on the selected first filter type and a plurality of candidate motion vectors (MVs);
selecting a MV based on a first interpolation error associated with one of the interpolation cost calculations;
performing one or more further interpolation cost calculations for interpolating between the reference frame and the subsequent frame based on one or more additional filter types and the selected MV; and
selecting a filter type for interpolating between the reference frame and the subsequent frame from the first filter type and one or more additional filter types based on the first plurality of interpolation cost calculations and the one or more further interpolation cost calculations, wherein a total number of interpolation cost calculations for selecting a filter type for interpolating between the reference frame and the subsequent frame is limited to the number of candidate MVs in the plurality of candidate MVs added to the number of additional filter types in the one or more additional filter types.

7. The method of claim 6, wherein selecting the first filter type includes selecting the first filter type randomly from a group of filter types, selecting the first filter type based on machine learning, or selecting the first filter type based on hysteresis analysis.

8. The method of claim 6, wherein the first filter type and one or more additional filter types include one or more of a regular filter, a sharp filter, and a smooth filter.

9. The method of claim 6, wherein performing one or more further interpolation cost calculations comprises performing only a single interpolation cost calculation for each of the one or more additional filter types before selecting the filter type for interpolating between the reference frame and the subsequent frame.

10. The method of claim 6, further comprising:
selecting a second filter type; and
performing a second plurality of interpolation cost calculations for interpolating between the reference frame and the subsequent frame based on the second filter type and the plurality of candidate MVs,
wherein selecting the MV includes selecting the MV based on a second interpolation error associated with the second plurality of interpolation cost calculations, and
wherein selecting the filter type for interpolating between the reference frame and the subsequent frame includes selecting the filter type from the first filter type, the second filter type, and the one or more additional filter types based on the first plurality of interpolation cost calculations, the second plurality of interpolation cost calculations, and the one or more further interpolation cost calculations.

11. The method of claim 10, wherein the interpolation cost calculations comprise a total number of interpolation cost calculations for selecting a filter type for interpolating between the reference frame and the subsequent frame equal to a number of candidate MVs in the plurality of candidate MVs added to the number of additional filter types in the one or more additional filter types.

12. The method of claim 6, wherein the first filter type and one or more additional filter types are selected from filter types available in AOMedia Video 1 video coding.

13. A device including at least one processor configured to:
select a first motion vector (MV) having a first interpolation error associated with an interpolation cost calculation for a first filter type;
calculate one or more interpolation costs based on one or more additional filter types and the first MV; and
select a filter type from the first filter type and one or more additional filter types based on the interpolation cost calculation for the first filter type and the interpolation costs based on the one or more additional filter types, wherein the processor limits a total number of interpolation cost calculations for selecting a filter type to a number of candidate MVs used for selecting the first MV added to the number of additional filter types in the one or more additional filter types.

14. The device of claim 13, wherein the processor is configured to:
select the first filter type randomly from a group of filter types, select the first filter type based on machine learning, or select the first filter type based on hysteresis analysis.

15. The device of claim 13, wherein the first filter type and one or more additional filter types include one or more of a regular filter, a sharp filter, and a smooth filter.

16. The device of claim 13, wherein the processor is configured to perform only a single interpolation cost calculation for each of the one or more additional filter types before selecting the filter type.

17. The device of claim 13, wherein the first filter type and the one or more additional filter types are selected from filter types available in AOMedia Video 1 video coding.

* * * * *